Figure 1A:
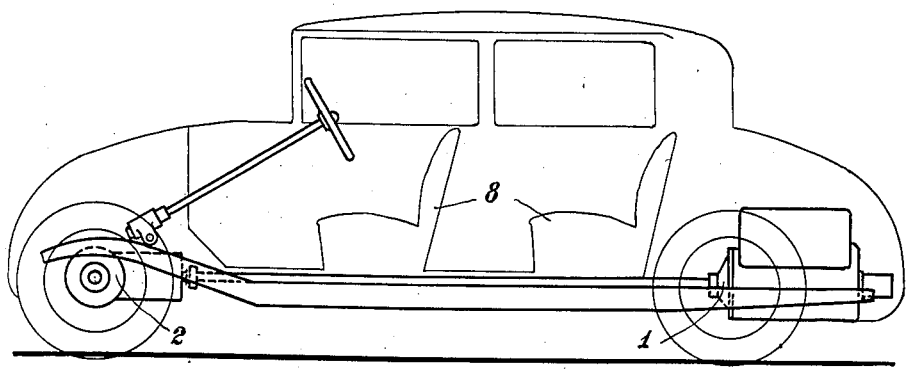

Nov. 21, 1933.                O. WINDBERGER                1,936,318
                              AUTOMOBILE VEHICLE
                              Filed Jan. 31, 1930        5 Sheets-Sheet 1

Nov. 21, 1933.  O. WINDBERGER  1,936,318
AUTOMOBILE VEHICLE
Filed Jan. 31, 1930   5 Sheets-Sheet 2
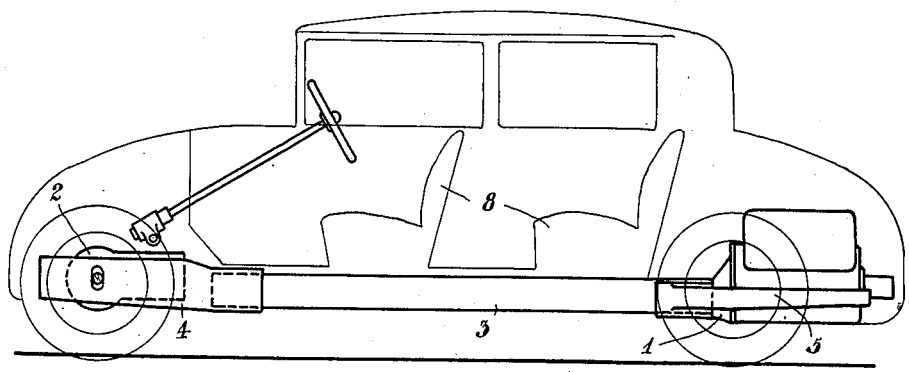
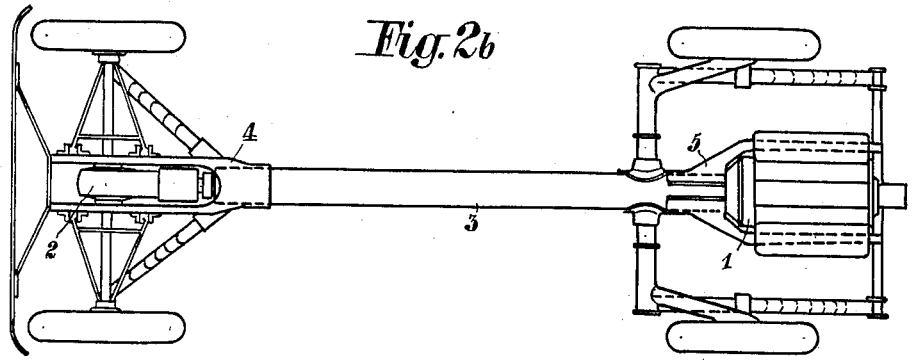

Nov. 21, 1933.  O. WINDBERGER  1,936,318
AUTOMOBILE VEHICLE
Filed Jan. 31, 1930  5 Sheets-Sheet 3

O. Windberger
INVENTOR

By: Marks & Clerk
ATTYS.

Nov. 21, 1933.    O. WINDBERGER    1,936,318
AUTOMOBILE VEHICLE
Filed Jan. 31, 1930    5 Sheets-Sheet 4
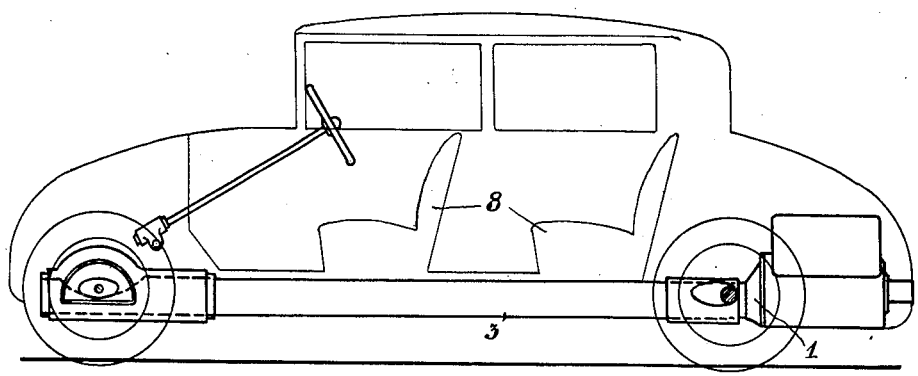
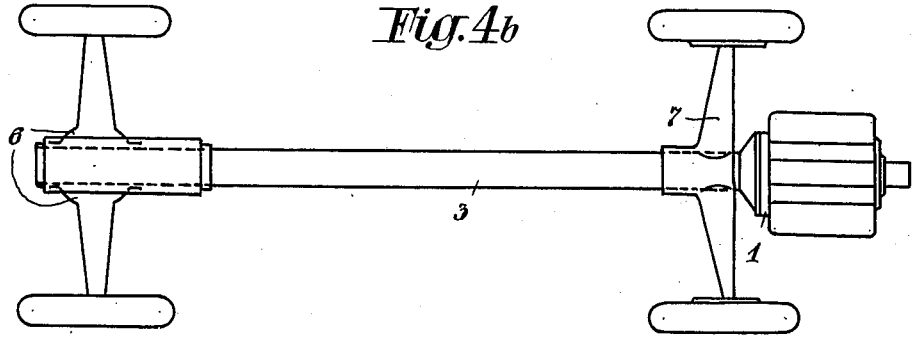
O. Windberger
INVENTOR

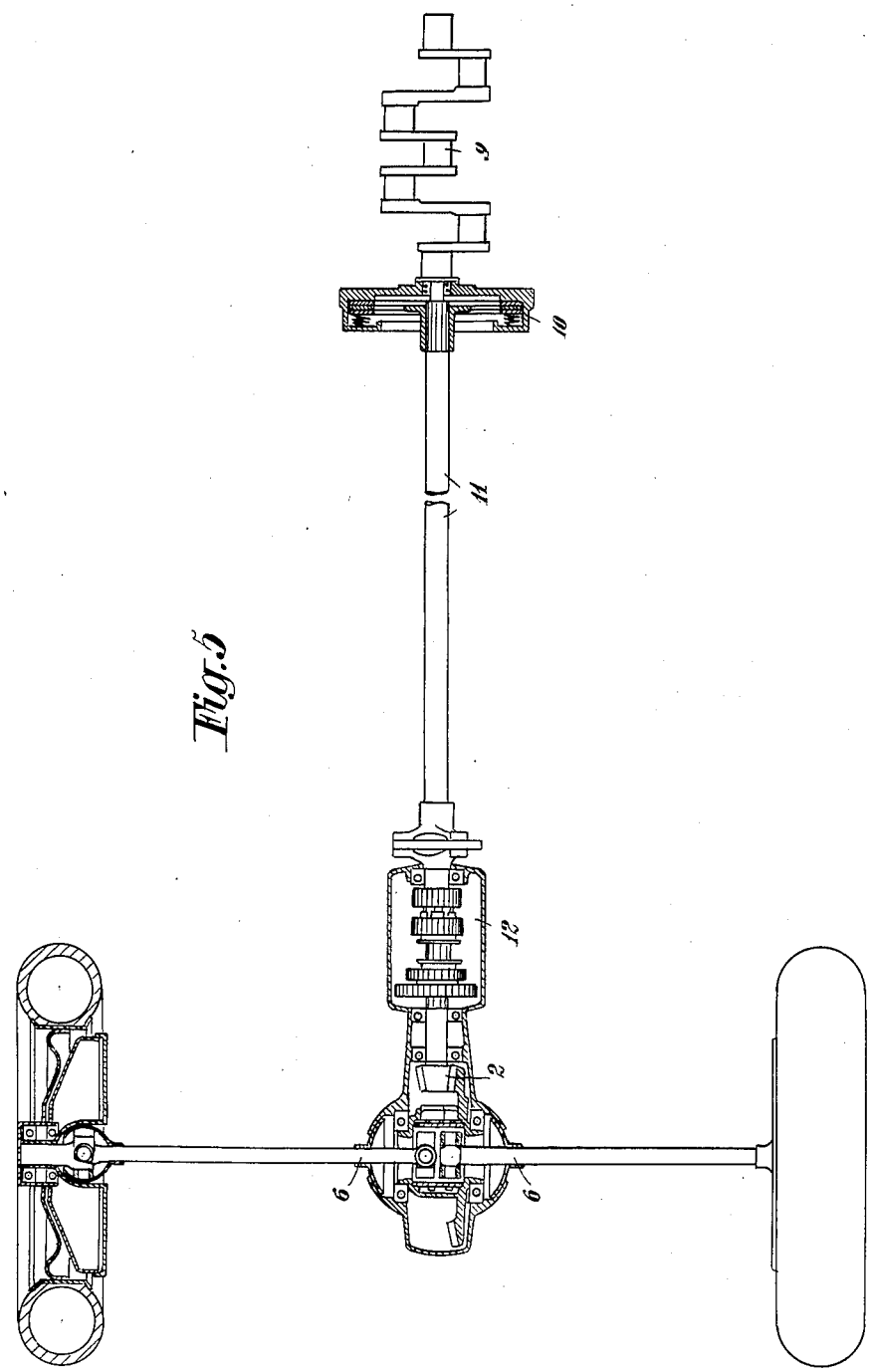

Patented Nov. 21, 1933

1,936,318

UNITED STATES PATENT OFFICE 1,936,318

AUTOMOBILE VEHICLE

Othmar Windberger, Wiener-Neustadt, Austria

Application January 31, 1930, Serial No. 425,040, and in Austria November 28, 1929

3 Claims. (Cl. 180—42)

Automobile vehicles with the motor located at the rear of the vehicle are known. In these vehicles the motor lies above the rear axle and the drive is effected by a shaft running from the motor to the differential gear of the front wheels. This known arrangement of the motor has in practice great drawbacks, which make up for the advantages obtained in mounting the motor at the rear. As is known, there must be a certain free space between the rear axle and the ground which cannot be made any smaller. Besides, there must be the possibility for the rear axle to swing upwards. Thus, the placing of the motor above the rear axle necessitates a location of the motor and of the Cardan shaft rather high above the ground, and in consequence also of the vehicle frame and the whole structure, since the floor needs be arranged above the Cardan shaft. In addition to this, the motor itself, placed above the rear axle, takes away very considerable space of the car body or the like.

According to the present invention all these drawbacks are avoided by arranging the motor so far behind the place of the frame where the rear axle is mounted that the space above the rear axle is free and can be utilized for accommodating the body of the vehicle. By these means a very considerable diminution of the height of construction and lowering of the point of gravity of the vehicle is obtained, which is of the greatest importance for automobile vehicles; and it is also rendered possible to place the seats in the most advantageous position between the axles, and to arrange more seats, three seats for example, side by side without increasing the width of the wheel track, so that a six-seater for example has only two rows of seats in the longitudinal direction, as compared with a normal present-day six-seater, in which three rows of seats have to be provided one behind another, with two seats in each row. A car according to the present invention, therefore, admits of being built a complete seat length shorter, that is to say, about 1400 millimetres shorter than an ordinary car having the same number of seats. This not merely enables the cost of upkeep and the weight of the vehicle to be reduced, but also yields the important advantage, from the point of view of safe travel and of greater facility in steering.

The arrangement according to the invention may be such that in front, both the axle drive and the change-speed gear are located, the drive being transmitted by a shaft, the Cardan shaft for instance, coming from the motor at the back.

The arrangement may alternatively be such that the radiator and even the petrol tank are also arranged in front, in which case, notwithstanding the fact of the engine being arranged at the back, the external appearance of the vehicle remains unchanged.

This arrangement however also ensures the driver having the accustomed consciousness of direction in steering a vehicle, because the bonnet-like construction of the car body located in front of him for lodging the radiator, the petrol tank and even the spare wheels, is similar to the present-day motor bonnet, though somewhat shorter.

Figure 1B:
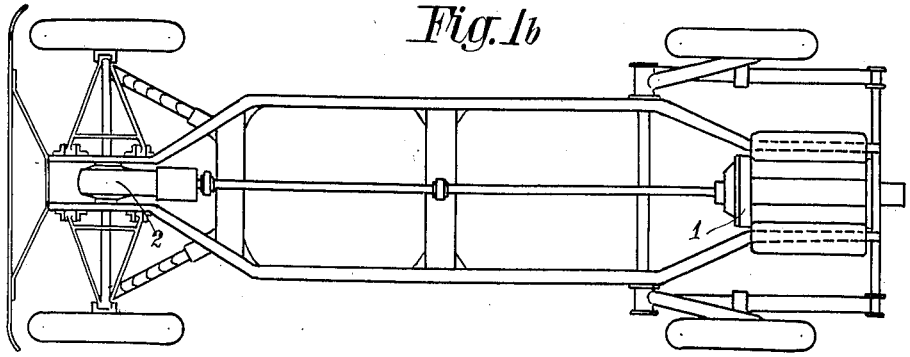
Figure 3A:
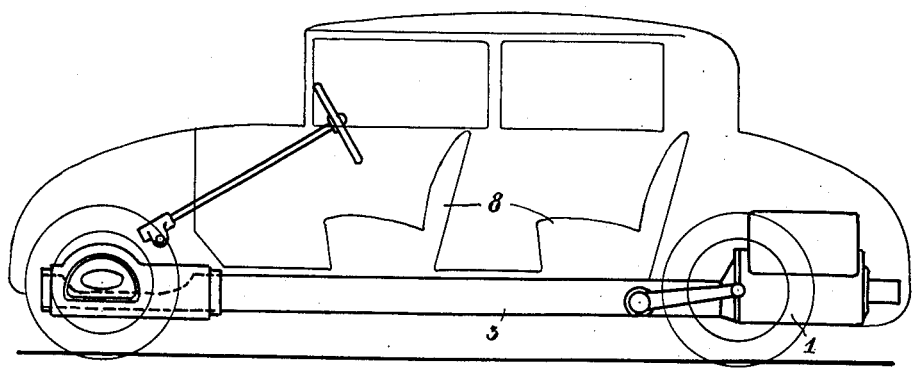
Figure 3B:
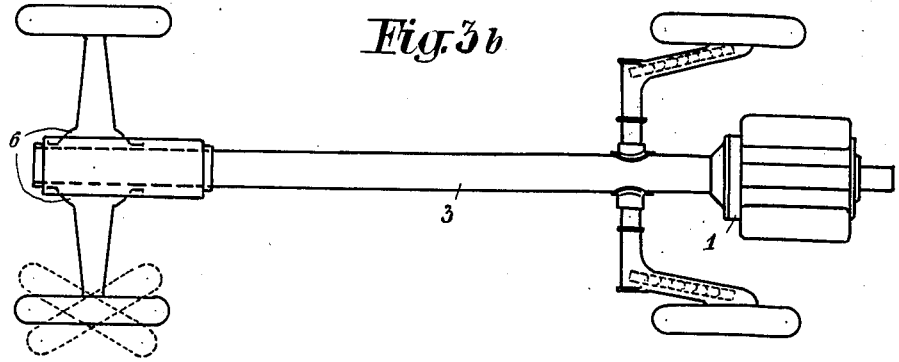

Various constructional forms of arrangement according to the present invention are illustrated diagrammatically by way of example in the accompanying drawings, in which Figures 1a and 1b show, in side elevation and in plan respectively, an automobile vehicle equipped with the ordinary car body, Figures 2a and 2b show the arrangement, again in side elevation and in plan respectively, in the case of a vehicle with a tubular frame, which is forked in the front and at the back, Figures 3a and 3b show, in side elevation and in plan respectively, a car with a tubular frame, on which swing axles are arranged in front and the motor is flanged to the back.

Figures 4a and 4b, show in side elevation and plan respectively, a car with a tubular frame, upon which swing axles are mounted in front and at the back, and Figure 5 is a partial view of the drive, partly in section.

The arrangement will be immediately obvious from the drawings.

The corresponding parts are denoted by the same reference numerals in all the figures. In all the figures the motor 1 is at the back and the front wheel axle drive 2 in the front. The tubular frame in Figures 2, 3 and 4 is denoted by 3, the front fork thereof by 4, and the rear fork by 5 (in Fig. 2). In Figure 3, 6 is the front swing axle bearing. In Figure 4, 6 and 7 are the front and rear swing axle bearings respectively. By 8 are denoted the seats arranged between the front and rear axles.

In Figure 5, 9 is the crank shaft of the motor, 10 the clutch, 11 the driving shaft, 12 the change-speed gear and 2 the axle drive of the front swing axles 6.

What I claim is:—

1. An automobile vehicle including a frame, a front axle for said frame and a rear axle mounted thereon supporting wheel on said axles, a body on the frame extending over the rear axle, a motor arranged behind the point of mounting of the rear axle on the frame, and a driving connection between the motor and the front axle, said frame being of tubular form and said axles being mounted as swing axles, said tubular frame receiving the driving connection between the motor and the front axle.

2. An automobile vehicle including a frame, a front axle for said frame and a rear axle mounted thereon, supporting wheels on said axles, a body on the frame extending over the rear axle, a motor arranged behind the point of mounting of the rear axle on the frame, and a driving connection between the motor and the front axle, said frame being of tubular form and provided at its rear end with a fork in which the motor is mounted behind the rear axle.

3. An automobile vehicle including a frame, a front axle for said frame and a rear axle mounted thereon, supporting wheels on said axles, a body on the frame extending over the rear axle, a motor arranged behind the point of mounting of the rear axle on the frame, and a driving connection between the motor and the front axle, said frame being of tubular form and provided at its rear end with a fork in which the motor is mounted behind the rear axle and provided at its front end with a fork in which the front axle is mounted.

OTHMAR WINDBERGER.